Nov. 21, 1967 W. H. LAZEAR ETAL 3,354,017
BAG MAKING APPARATUS
Filed April 20, 1964 2 Sheets-Sheet 1
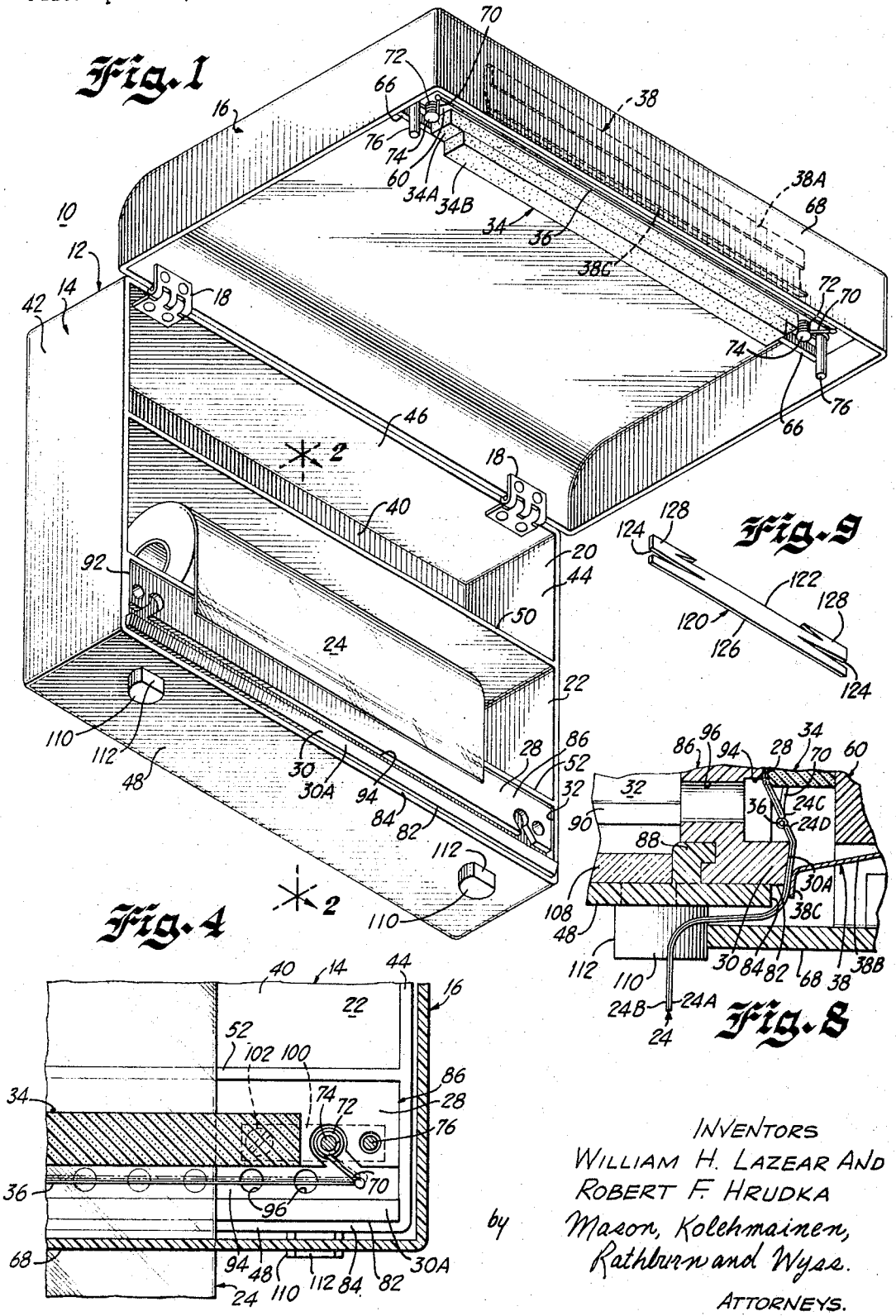
INVENTORS
WILLIAM H. LAZEAR AND
ROBERT F. HRUDKA
by Mason, Kolehmainen,
Rathburn and Wyss
ATTORNEYS.

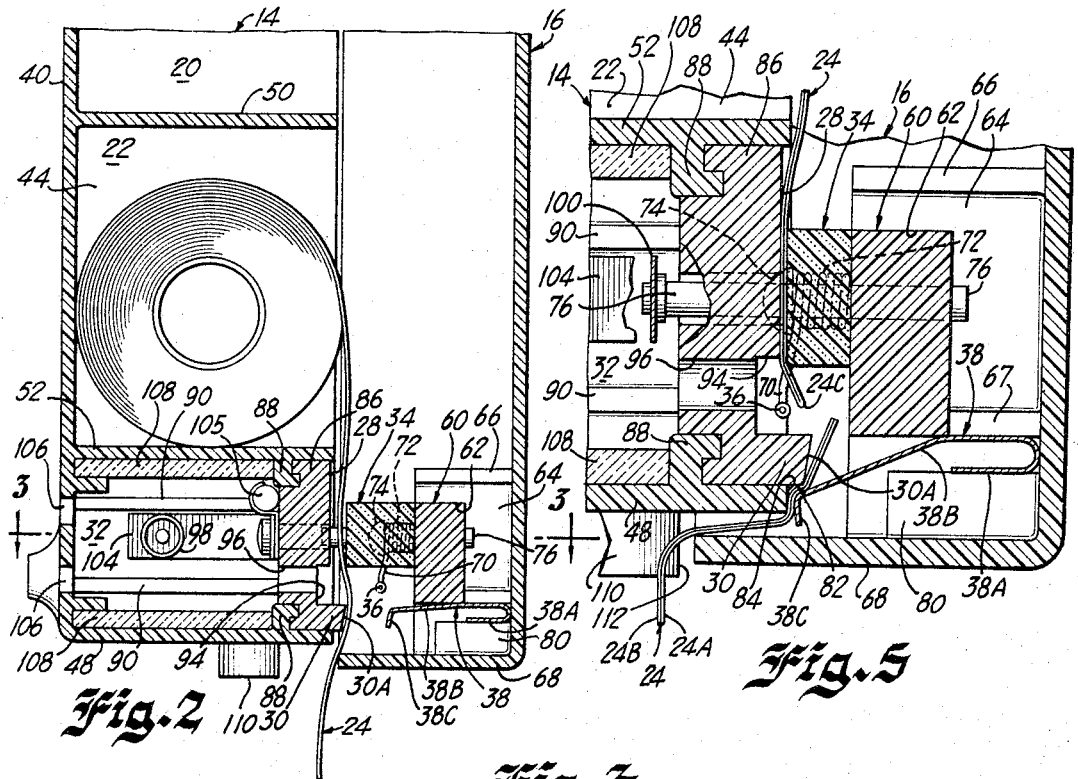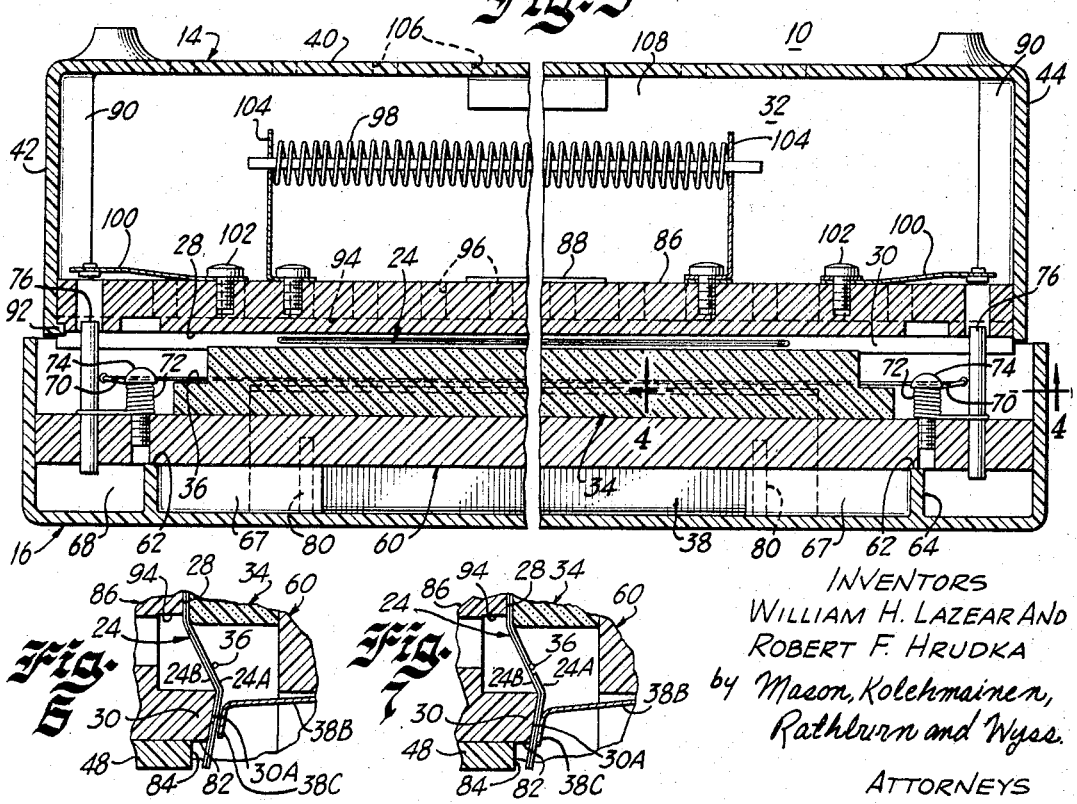

United States Patent Office 3,354,017
Patented Nov. 21, 1967

3,354,017
BAG MAKING APPARATUS
William H. Lazear and Robert F. Hrudka, Winnetka, Ill., assignors to H & L Machine Corp., Winnetka, Ill., a corporation of Illinois
Filed Apr. 20, 1964, Ser. No. 361,196
1 Claim. (Cl. 156—494)

The present invention relates to improvements in apparatus for making bags from plastic sheet material and is an improvement upon the apparatus disclosed in the copending application of William H. Lazear, Ser. No. 326,817, filed Nov. 29, 1963, which also claims certain features embodied in the present apparatus.

The present invention has to do with improvements in apparatus for making bags from thermoplastic sheet material, such as polyethylene, and the like. It has for its primary object the provision of new and improved apparatus whereby bags can be made readily and simply with the use of a box-like structure and upon closure of a movable lid or cover associated therewith.

A further object of the present invention is to provide new and improved bag making apparatus including a pair of relatively movable structures, one of which may be a box or compartment defining structure and the other a movable lid or cover, which structures have opposed film clamping and tensioning means and film severing and sealing means intermediate the clamping and tensioning means so constructed and arranged relative to each other that, as the compartment is closed by the cover, the film is engaged between the clamping means, tensioned and then severed and sealed.

A further object of the present invention is to provide apparatus of the type set forth above provided with selectively operable means controlling the extent of movement of the cover for effecting severing and sealing of both the severed edges, i.e., the edge at the clamped end of the film and at the edge of the tensioned end or sealing only at the clamped end.

A further object of the present invention is to provide bag making apparatus with simplified film tensioning means comprising an anvil and flexible resilient tensioning means on the movable cover adapted to hold the film on the anvil and to move it therealong and, furthermore, in which the tensioning is increased and the severed end more rapidly moved from the clamped end by constructing the anvil with a step down which the tensioning means pulls the film.

A further object of the present invention is the provision of a new and improved bag making apparatus of the type referred to above including a heated wire type of film heating and severing means and in which the latter is manufactured as a separate unit for detachably mounting in the movable lid or cover of the apparatus.

A further object of the present invention is the provision of the apparatus with a structural sub-assembly including the previously referred to clamping and anvil elements, which sub-assembly is adapted also readily and detachably to be placed in the compartment defining structure.

In brief, the apparatus of the invention includes a pair of relatively movable elements of which one may be a back or bottom having one or more compartments for holding the film. The film is of suitable thermoplastic material, such as polyethylene, and, while made of tubular material (with gussets at opposite sides, if desired), is rolled in flattened shape. In making a bag, the user draws from the compartment a desired length of the film for making a bag. The compartment has mounted on it forwardly of the roll a fixed clamping element and a fixed anvil which may be inclined downwardly and forwardly from the clamping element and terminate in a downwardly extending step. The cover has mounted upon it a second and compressible clamping element opposite the first one and a tensioning element opposite the anvil. A heated wire type of film severing and sealing element, of the type disclosed in the above referred to copending application, is located at the underside of the cover between the clamping and tensioning elements. The tensioning element includes a flexible or resilient plate having a downwardly and forwardly extending foot portion adapted to engage film on the anvil. As the cover is moved toward its ultimate closed position, the tensioning element slides down the anvil and step and, thus applies a frictional tensioning force to the film which is more effective upon the upper or outer layer of the film than on the lower one. When the cover is closed, the film is clamped and tensioned and the severing and sealing element energized at about the time it engages the upper layer which is under greater tension than the lower one. As the cover is moved to its final closed position, the heated wire element severs both layers and the severed portion is quickly drawn from the clamped portion by the foot portion of the tensioning element sliding down the inclined surface and the step portion. The sealing element is constructed and arranged to move toward the clamped severed end edge and substantially in the plane of the film thereby effectively to seal the clamped end. The severed and tensioned edge, however, is substantially unsealed so that it can be readily opened by the user.

In accordance with a further feature of the invention the apparatus may be provided with selectively operable means for determining the extent of movement of the cover relative to the compartment thereby selectively to effect the aforementioned sealing of the clamped end alone or to effect severing and sealing of both the clamped and the tensioned ends.

Other objects and advantages of the present invention will become apparent from the ensuing description of an illustrative embodiment thereof, in the course of which reference will be had to the accompanying drawings, in which:

FIG. 1 is a perspective view of an embodiment of the present invention in an initial or normal inoperative position (cover open) prior to withdrawing plastic material and a severing and sealing operation in making a bag;

FIG. 2 is a fragmentary enlarged longitudinal cross sectional view taken along the line 2—2 of FIG. 1, with portions of the apparatus in a different operative position but one prior to severing and sealing of the plastic film in making a bag;

FIG. 3 is a transverse cross sectional view taken along the line 3—3 of FIG. 2;

FIG. 4 is a fragmentary cross sectional view taken along the line 4—4 of FIG. 3, showing in solid lines the position of the wire element when unheated and, in phantom, the heated position;

FIG. 5 is a fragmentary cross sectional view similar to FIG. 2 but illustrating the apparatus in position at the termination of a bag forming and sealing operation, at which time the cover is in its final or closed position for sealing only one of the severed edges;

FIGS. 6 and 7 are views similar to FIG. 5 illustrating two intermediate positions occupied by the apparatus in moving from the initial position of FIG. 2 to that of the final position of FIG. 5;

FIG. 8 is a view similar to FIGS. 5, 6 and 7 illustrating the apparatus in sealing position when it is selectively conditioned to seal both the clamped and tensioned edges that are formed upon severing of the film, the illustrated position being determined by stop means limiting closing movement of the cover; and FIG. 9 is a perspective view of a modified film tensioning element that can be used with the previously described embodiment.

Referring now to the drawings, the plastic bag making apparatus of the present invention is indicated as a whole by reference character 10. The main components of the apparatus are what may be considered a cabinet 12, including a pair of relatively movable means comprising a stationary back or lower compartment portion 14 and a cover or lid 16 movably supported by hinges 18 and which is adapted to be moved by a closing operation from the normal initial or inoperative position illustrated in FIG. 1 to a final closed position illustrated in FIG. 5 in a bag forming operation. The cabinet may be supported flat as upon a table or vertically, as illustrated, upon a wall, not shown.

The compartment 14 includes a pair of spaces 20 and 22 for holding rolls of flat tubular thermoplastic film 24, of which but a single roll has been illustrated. The film is of what may be described as tubular two-ply type including top and bottom plies 24A and 24B and, while not illustrated, generally has gussets at opposite sides. It is adapted to be withdrawn over a first and stationary clamping element 28 and an anvil 30, formed from one piece of material such as Bakelite, supported at the front or lower end of the compartment 14 in a space 32, as will be described in greater detail hereinafter. A second roll, not shown, may be placed in space 22.

In accordance with the invention, the movable lid or cover portion 16 is provided with an upper film clamping or gripping element 34 of resilient material, such as sponge rubber, an elongated transversely extending energizable heated wire type sealing and severing element 36, and film tensioning means 38 constructed and arranged to apply tension to and to pull the severed portion away from the clamped portion in a severing and sealing operation when the cover is closed down upon the compartment, as will be further described hereinafter.

The cabinet includes a back or bottom wall 40, spaced apart side walls 42 and 44, a rear wall 46 and a front wall 48. Walls 50 and 52 extend between the side wall of the compartment to provide the previously referred to spaces 20, 22 and 32.

The upper clamping element 34 and severing and sealing wire 36 are mounted inside of and at the front end of the cover. The clamping element consists of two adhesively secured relatively thick and compressible strips 34A and 34B of sponge rubber secured as by adhesive to a mounting plate 60 in the form of an elongated strip of suitable insulating material, such as Bakelite. The strip extends the full width of the cover and a structural sub-assembly including the strip, the clamping element and wire 36 is detachably and easily secured therein as by friction mounting in a pair of grooves 62 formed in short longitudinally disposed ribs 64 extending between the front of the cover and short transverse ribs 66 at the sides of the cover. Additionally, the strip is seated upon an elongated transverse rib 67 extending between ribs 66.

The wire 36 is supported between the clamping means 34 and the lower wall 68 of the cover as by a pair of short oppositely extending metallic spring arms 70 projecting from portions of the spring 72 wound about supporting screws 74 secured to and projecting away from the strip. The spring arms are of electrical conducting material and are arranged to hold the wire under tension and the arrangement is such that when the wire is energized and heated so as to expand, the spring arms move the wire rearwardly and toward the clamping means substantially in the plane of the plastic film, thereby effectively sealing the clamped severed edge of the film. The spring arms are connected to downwardly extending terminal pins 76 adapted to engage terminals supplied with electric current when the lid is closed, as will hereinafter be described in greater detail, so that there is no current supplied to the pins 76 and the wire 36 until the cover is substantially closed.

The film tensioning means 38 is suitably secured, such as frictionally and detachably, by insertion between the strip 60 and a couple of spaced apart short internal ribs 80 projecting rearwardly from the front side of the lid 16 and the transverse rib 67 extending between the ribs 66, heretofore referred to. Referring now particularly to FIGS. 2 and 5, it will be noted that the tensioning means 38 has a generally U-shaped portion 38A inserted between the rib 80 and rib 67. It includes also a relatively long and flexible intermediate portion 38B that terminates in a foot 38C projecting forwardly or downwardly toward the front of the lid. The portion 38B is bent slightly to insure that the foot portion 38C will engage the film upon the anvil 30 and apply tension to it and move it away from the heated wire during a severing and sealing operation. The tensioning means 38 is preferably made of metal, such as a resilient brass plate, so that in operation it will readily move from the position of FIG. 2 through the operative positions shown in FIGS. 6, 7 and 5.

In order to enhance the application of tension to the film, the top surface 30A of the anvil is inclined downwardly and rearwardly so that the foot 38C of the tensioning plate will more readily move down it and, in so doing, apply tension to the film engaged between it and the anvil. This tension is desired in order better to sever the film and quickly remove the severed portion away from the wire 36 in order that it will not be substantially sealed. The arrangement is such that the tension is applied primarily to the upper or outer layer 24A, which is also severed first. As a result, the severed edge upper layer is moved away from the lower layer, thereby to minimize the possibility of the two layers of the severed and tensioned edge of the removed part being sealed together. Generally the film should have considerable slip, so that the upper layer will move relatively to the lower one. Also, the underside of the foot should be roughened to increase its friction. Alternatively, some rough substance may be attached to it.

The above operation may be noted from a comparison of FIGS. 2, 6, 7 and 5. In FIG. 2, the tensioning plate 38 is some distance from the anvil and in FIG. 6 it is just about to engage the film 24 upon the anvil 30. The heated wire 36 is not energized at this time. In FIG. 7, the foot has engaged the film against the anvil and moved down the anvil a short distance. The wire has become heated and initially severed the upper film layer 24A and the upper layer has been moved relative to the lower one. In FIG. 5 the wire has severed both elements and has moved rearwardly to the dotted line position of FIG. 4 to provide a seal at the severed edge 24C of the portion of the film clamped between the clamping elements 28 and 34.

In accordance with a further feature of the invention, the tensioning plate 38 and the anvil 30 are so arranged that at the completion of the movement the foot 38C slides off what might be considered a step in the anvil, thereby more quickly to remove the severed portion of the film and, likewise, effect lifting movement of it away from the heated wire, thereby additionally to minimize the formation of a seal at the severed and tensioned end. Actually the step is provided by a projecting front edge 82 of the anvil and the upper edge 84 of the front 48 of the back of the cabinet 14.

In accordance with the invention, the clamping element 38 and the anvil 30 are formed as integral parts of a sub-assembly including the Bakelite strip 86 supported at the lower or front of cabinet 14 and near its open side. It is so supported upon a pair of opposed ledges 88 in compartment wall 52 and front wall 48 and upon upstanding vertical ribs 90 extending from the bottom wall 40 to the underside of the strip. The strip 86 is adapted readily to be inserted into place as under a ledge 92 at the outer end of wall 42, as best illustrated in FIG. 3.

The Bakelite strip 86 is provided with a transverse channel or recess 94 to accommodate the heated wire element 36 at its final position. Transverse series of ventilating openings 96 are provided in the strip for dissipation of heat from a resistor 98 which will be described shortly.

As previously described, the heated wire element 36 is normally not supplied with energy. It is supplied with energy only after the cover or lid 16 has been moved substantially to close the box. When so closed, the terminals 76 engage flexible terminal strips 100 secured to the underside of strip 86 by the screws 102. The terminals 100 are normally supplied with current and when engaged by the terminal strips 76 the heated wire element is energized in series in resistor 98 and through a fuse 105 which is supported in the forward space 32 upon a pair of brackets 104. Heat from the resistor 98 is dissipated through the previously referred to ventilating openings 96 and other openings 106 in the bottom wall 40. Additional heat insulation is provided by a pair of transverse asbestos strips 108, one disposed adjacent compartment wall 52 and the other adjacent the front wall 48, as best shown in FIGS. 2 and 3.

The apparatus has means for selectively determining whether a seal will be formed only at the clamped severed edge or at both it and the tensioned severed edge. This means includes the rotatable buttons 110 at the front of compartment 14 having flats 112 adapted to face upwardly to permit the cover to go to the position of FIG. 5 in the making of a single seal. To make the double seal, the flats are turned down and the round parts of the buttons restrict closing movement of the cover so that it only goes to the position of FIG. 8, in which position both severed edges are sealed.

A modified form of film tensioning element 120 is illustrated in FIG. 9. This element may be substituted for the element 38 in the previously described embodiment. It is made of some suitable plastic material, such as polypropylene and provided with flexibility or resiliency both vertically and transversely so that when engaged with the film on the anvil upon closure of the lid, the element flexibly or resiliently moves from a position corresponding to that of FIG. 6 through that of FIG. 7 to the position of FIG. 5. The aforementioned resiliency is provided by a cut 122 at its upper side providing spaced arms 128 and a pair of triangular cuts 124 at its opposite edges. The result is lower film contacting cross piece 126, which may be inclined slightly downwardly and forwardly at an angle corresponding to the surface 30A of the anvil. In operation, the portion 126 engages the upper layer of the film and moves it relative to the lower layer, the same as the previously described element 38. When the cover is closed, the upper spaced arms 128 compress slightly and the cutaways 124 enable the element to flex forwardly.

It will be apparent from the foregoing detailed description of the device that it can be constructed readily and economically. The upper clamping element and the hot wire severing and sealing element together with the downwardly projecting contacts through which the wire is energized are readily constructed as a sub-assembly with the mounting strip 60, which is adapted detachably to be mounted at the underside of the cover. Likewise, the tensioning element 38 may be readily formed and then simply and detachably inserted into the cover in front of the mounting strip 60. In like manner, the lower clamping element 28 and anvil 30 are formed as an integral part of the strip 86 which is detachably mounted in the compartment 14 and forms part of a sub-assembly including the terminals 100 and the current limiting resistor 98.

In operation, a length of the tubular plastic film 24 is drawn downwardly or forwardly from the roll past the lower clamping element 28 and the anvil 30. Assuming that no bag had previously been made, only a short length of the film is withdrawn. Thereafter, the cover is closed and brought from the position of FIG. 2 through the positions of FIGS. 6 and 7 to the final position of FIG. 5. During this operation, the severed edge of the clamped portion is sealed, as indicated by reference character 24C in FIG. 5. The severed withdrawn portion acted upon by the tensioning means 38 is substantially unsealed so that it can be opened by the user.

Assuming now that a bag is to be made, a sealed end portion 24C of the film is withdrawn and again brought beyond the clamp 28 and anvil 30 to a desired length corresponding to the length of the bag desired. The cover is again moved through the positions of FIGS. 2, 6 and 7 to the position of FIG. 5. In the position of FIG. 2, the wire element 36 is unheated. As the cover is brought to the position of FIG. 6, the film is clamped between the clamping elements 28 and 34 and, at about the position of FIG. 6, the wire 36 is energized by engagement of the terminal pins 76 with the flexible contacts 100. The energization of the wire 36 is effected through the resistor 98 and the fuse 105. At somewhat the same time the foot 38C of the tensioning means engages the film against the tinclined surface 30A and frictionally applies tension to the film, primarily through the upper or outer layer 24A. While thus tensioned, the heated wire element severs first the outer layer 24A and the greater tension on the outer layer first severs the outer layer and the latter is moved relative to the lower layer, as indicated by the exaggerated spacing in FIG. 7. Thereafter, the film is maintained under continued tension while the wire 36 severs the lower layer and the foot 38C moves down the step 84 thereby to apply increased tension to the severed part of the film to move it away from the heating element without its being effectively sealed.

The clamped or held portion of the film is sealed at 24C by virtue of the fact that it is not positively moved away from the heated element and because the heated element moves toward the severed edge as a result of the force applied to the expanding heated element by the springs 72 and spring arms 70, as shown in FIG. 4.

After the bag has been formed, the cover is lifted back to the position of FIG. 1 and the apparatus is ready for a repeat operation.

If it is desired to seal both the clamped and severed edges of the film, the cover movement controlling buttons 110 are moved from the positions in which they are illustrated with the flats 112 facing upward to a position in which the flats face downwardly. When this is done, the movement of the cover is limited so that it moves only to the position illustrated in FIG. 8 whereat the heated element acts both to sever and to seal both edges 24C and 24D of the film. It has been found that with this operation the withdrawn edge 24D is severed, even though the wire 36 is moved by its associated spring arms toward the held and sealed edge 24C.

The apparatus conditioned as described above for sealing both edges may be utilized to seal a previously formed unsealed bag. Such a bag can be placed in the apparatus over the clamping and anvil elements and the cover operated from the position of FIG. 2 to the position of FIG. 8.

The operation described above is substantially the same when using the modified form of tensioning element illustrated in FIG. 9.

While the present invention has been described in connection with the details of an illustrative embodiment thereof, these details are not intended to be limitative of the invention except insofar as set forth in the accompanying claim.

What is claimed as new and desired to be secured by Letters Patent of the United States is:

A device for making bags from thermoplastic multilayer tubular film, including in combination, a stationary compartment having a plurality of spaces for reception of rolls of the film in flattened condition, said compartment having another space forward of the first ones, a sub-assembly mounted at the upper part of said other space including a strip of insulating material having at its side adjacent the film receiving spaces a substantially flat clamping surface and at its front end an anvil comprising an inclined surface projecting above a front wall of the compartment and constituting a step therewith, said strip having a transverse recess between the clamping surface and anvil, said recess having a plurality of ventilating apertures therealong, and said strip having access openings adjacent its ends, the sub-assembly including also flexible terminals at the opposite ends of the strip accessible through said access openings, the sub-assembly including also a resistor and fuse arranged in series with one of said terminals supported at the underside of the strip, heat insulating strips at the edges of the spaces on opposite sides of the resistor, the compartment having other ventilating openings at its underside leading to said other space, a cover hingedly secured to the compartment, said cover having at its forward underside above the first mentioned sub-assembly a second detachably mounted sub-assembly including a strip of insulating material to a side of which is secured a resilient compressible clamping element opposite the first mentioned clamping element, said sub-assembly including an expansible heated wire type film sealing and severing element disposed forward of the clamping element and adapted to enter said groove when the cover closes the compartment, said sub-assembly including also resilient supporting arms for the wire whereby the wire is moved toward the clamping elements when it is energized and heated, film tensioning means comprising a flexible plate detachably mounted in the cover in front of the sub-assembly and including a foot portion opposite the anvil, said foot portion being adapted to slide along the anvil surface and down the step constituted by the projecting portion of the anvil and thereby tension film between it and the anvil, said compartment including adjustment means for determining the extent of movement of the cover relative to the compartment, said adjustment means being effective in a first position to limit movement of the cover so that the foot portion of the tensioning means does not move off the inclined surface of the anvil, and being effective in a second position to enable the cover to move so that the foot of the tensioning means moves down and off the inclined surface and the step, said heated wire element being so disposed that in the first position of said adjustment means it remains substantially in the plane of the film between the clamping means and anvil and in the second position it goes slightly across the plane of the film.

References Cited

UNITED STATES PATENTS 2,649,672   8/1953   Thompson     156—251
3,196,067   7/1965   Techtmann     156—583

EARL M. BERGERT, *Primary Examiner.*

DOUGLAS J. DRUMMOND, *Examiner.*